(12) United States Patent
Vanliefde et al.

(10) Patent No.: US 10,945,527 B2
(45) Date of Patent: Mar. 16, 2021

(54) RACK SYSTEM DISPOSED WITH A POLYMERIC CAP

(71) Applicant: BELINTRA NV, Semmerzake (BE)

(72) Inventors: Charlotte Vanliefde, Semmerzake (BE); Peter Van Der Vennet, Semmerzake (BE)

(73) Assignee: BELINTRA NV, Semmerzake (BE)

( * ) Notice: Subject to any disclaimer, the term of this patent is extended or adjusted under 35 U.S.C. 154(b) by 243 days.

(21) Appl. No.: 16/300,599

(22) PCT Filed: May 23, 2017

(86) PCT No.: PCT/EP2017/062323
§ 371 (c)(1),
(2) Date: Nov. 12, 2018

(87) PCT Pub. No.: WO2017/202800
PCT Pub. Date: Nov. 30, 2017

(65) Prior Publication Data
US 2020/0178689 A1 Jun. 11, 2020

(30) Foreign Application Priority Data

May 24, 2016 (BE) .................................. 2016/5382

(51) Int. Cl.
*A47B 96/14* (2006.01)
*A47B 47/02* (2006.01)
(Continued)

(52) U.S. Cl.
CPC ........ *A47B 96/1408* (2013.01); *A47B 47/027* (2013.01); *A47B 47/0083* (2013.01);
(Continued)

(58) Field of Classification Search
CPC ... A47B 96/1408; A47B 96/06; A47B 47/027; A47B 47/083; A47B 57/404; B65G 1/02
See application file for complete search history.

(56) References Cited

U.S. PATENT DOCUMENTS 3,804,542 A * 4/1974 Hammerschmidt ...... F16B 7/18
403/264
3,977,800 A * 8/1976 Cassel ................... F16B 7/0446
403/172
(Continued)

FOREIGN PATENT DOCUMENTS

| AU | 2006 100 157 A4 | 3/2006 | |
|---|---|---|---|
| DE | 10 2008 006439 A1 | 7/2009 | |
| GB | 2453012 A * | 3/2009 | ............. A47B 96/06 |

OTHER PUBLICATIONS

PCT International Search Report and Written Opinion dated Aug. 29, 2017 for PCT International Patent Application No. PCT/EP2017/062323, 9 pages.

(Continued)

*Primary Examiner* — Stanton L Krycinski
(74) *Attorney, Agent, or Firm* — Amster, Rothstein & Ebenstein LLP

(57) ABSTRACT

The invention provides a rack system (500) comprising a plurality of metal profiles (200, 300), one or more of the metal profiles comprising a first end, wherein the first end is disposed with a polymeric cap (100).

10 Claims, 5 Drawing Sheets

(51) Int. Cl.
*A47B 47/00* (2006.01)
*A47B 57/40* (2006.01)
*A47B 96/06* (2006.01)
*B65G 1/02* (2006.01)

(52) U.S. Cl.
CPC ............ *A47B 57/404* (2013.01); *A47B 96/06* (2013.01); *B65G 1/02* (2013.01)

(56) References Cited

U.S. PATENT DOCUMENTS

| | | | | |
|---|---|---|---|---|
| 4,161,375 A * | 7/1979 | Murphy | ................ | F16B 7/0446 403/169 |
| 4,250,679 A * | 2/1981 | Burg | ...................... | A47B 57/40 52/653.2 |
| 4,285,610 A * | 8/1981 | Rusch | ................... | F16B 5/0685 403/189 |
| 4,516,376 A * | 5/1985 | King | .................. | A47B 47/0008 403/171 |
| 4,770,560 A * | 9/1988 | Ott | ..................... | A47B 47/0008 403/296 |
| 4,934,858 A * | 6/1990 | Beaulieu | ................. | F16B 12/40 403/174 |
| 4,951,925 A * | 8/1990 | Schultz | ................... | F16B 7/048 256/65.06 |
| 5,048,995 A * | 9/1991 | Beaulieu | ................. | F16B 12/44 403/264 |
| 5,566,926 A * | 10/1996 | Voigt | .................. | E04F 11/1814 256/13.1 |
| 5,695,081 A | 12/1997 | Alkalay | | |
| 6,032,431 A * | 3/2000 | Sugiyama | ............... | F16B 9/058 52/656.9 |
| 6,332,657 B1 * | 12/2001 | Fischer | .............. | A47B 47/0008 312/111 |
| 7,004,667 B2 * | 2/2006 | Ludwig | ..................... | E04B 9/14 403/258 |
| 7,125,002 B2 * | 10/2006 | Platt | .................... | E04H 17/1421 256/65.04 |
| 7,883,288 B2 * | 2/2011 | Jorna | .................... | F16B 7/0486 403/171 |
| 10,441,074 B2 * | 10/2019 | Dahatonde | ............. | A47B 96/06 |
| 2016/0095431 A1 * | 4/2016 | Chen | .................... | A47B 96/061 248/476 |
| 2016/0249750 A1 * | 9/2016 | Taylor | .................... | A47F 5/105 211/186 |

OTHER PUBLICATIONS

PCT Notification of Transmittal of the International Preliminary Report on Patentability dated Aug. 17, 2018 in connection with PCT International Patent Application No. PCT/EP2017/062323.

* cited by examiner

RACK SYSTEM DISPOSED WITH A POLYMERIC CAP

CROSS-REFERENCE TO RELATED APPLICATIONS

This application is a U.S. national stage entry under 35 U.S.C. § 371 of PCT International Patent Application No. PCT/EP2017/062323, filed May 23, 2017, which claims priority to Belgian Patent Application No. 2016/5382, filed May 24, 2016, the contents of which are incorporated herein by reference in their entirety.

FIELD OF THE INVENTION

The invention provides rack systems comprising a plurality of metal profiles, one or more of the metal profiles comprising a first end, wherein the first end is disposed with a polymeric cap.

BACKGROUND

Rack systems for the storage of objects on shelving or drawers thereon are used in a large variety of industries. The objects may be for instance, equipment, consumables, One of these industries is the medical sector.

State-of-the-art systems comprise mechanical connections in which metal profiles abut so forming a frame of the rack system on which supports such as shelves and drawers can be attached. Adjustability and stability of rack systems is paramount. In these mechanical connections, surface damage may occur during assembly or adjustment because due to mechanical stress between abutting metal profiles. This in turn can weaken the stability and can induce a lack of rigidity in the construction. State-of-the-Art systems are also difficult to assemble and disassemble because of friction between abutting metal profiles.

Accordingly there is a need for a rack system for storage which overcomes the problems of the art.

SUMMARY OF THE INVENTION

The rack systems provided herein address one or more drawbacks of the methods of the prior art. In particular, the rack systems involve metal profiles disposed with polymeric caps. These polymeric caps allow avoiding damage to metal profiles. Furthermore, the polymeric caps reduce friction between abutting metal profiles. Accordingly, assembly and disassembly is made easier. Also, the rack systems have the additional advantage of having a superior rigidity. This is created by the clamping/tension forces provided by the polymeric caps.

Thus, provided herein are rack systems, polymeric caps, and the use of polymeric caps according to the following aspects:

Aspect 1. Rack system (500) comprising a plurality of metal profiles (200,300), one or more of the metal profiles (200,300) comprising a first end, wherein the first end is disposed with a polymeric cap (100) and is dismountably attached to an adjoining metal profile (200, 300) of the plurality, wherein at least a part of the polymeric cap (100) is disposed between the first end and a face of the adjoining metal profile (200,300).

Aspect 2. The rack system (500) according to aspect 1 wherein some of the metal profiles (200,300) are arranged horizontally and some vertically, wherein the first end disposed on a horizontal metal profile (200) is configured for the dismountable attachment to a vertical metal profile (300), and wherein at least a part of the polymeric cap (100) is disposed between the first end of the horizontal metal profile (200) and the vertical metal profile (300).

Aspect 3. The rack system (500) according to aspect 2 wherein the vertical profiles (300) are disposed with a plurality of apertures (320), optionally regularly spaced, along at least one face of a vertical profile (300), each aperture configured for receiving a coupling clip (400) for dismountable attachment to the first end of the horizontal profile (200).

Aspect 4. The rack system (500) according to aspect 3 wherein the coupling clip (400) comprises a tapered member (420).

Aspect 5. The rack system (500) according to any one of aspects 1 to 4 wherein the polymeric cap (100) is compressible.

Aspect 6. The rack system (500) according to any one of aspects 1 to 5 wherein the polymeric cap (100) comprises polyoxymethylene (POM).

Aspect 7. The rack system (500) according to any one of aspects 1 to 6 wherein the polymeric cap (100) comprises a buffer section (110) and a clamping section (120).

Aspect 8. The rack system (500) according to aspect 8 wherein the clamping section (120) comprises a plurality of oblong protrusions (130) that are fittingly received by the profile first end.

Aspect 9. The rack system (500) according to aspects 7 or 8 wherein the clamping section (120) is tapered.

Aspect 10. The rack system (500) according to any one of aspects 1 to 9 wherein the polymeric cap (100) is disposed on the first end at the terminal edge, and wherein the terminal edge is flat.

Aspect 11. The rack system (500) according to any one of aspects 1 to 10 wherein the rack system (500) is a rack system for shelving or drawers.

Aspect 12. The rack system (500) according to any one of aspects 1 to 11 wherein the metal profiles (200,300) are hollow.

Aspect 13. The rack system (500) according to any one of aspects 1 to 12 wherein the metal profiles (200,300) are made of aluminium.

Aspect 14. A polymeric cap (100) configured for use in a rack system (500) of any one of aspects 1 to 13.

Aspect 15. Use of polymeric cap (100) in a rack system (500) of any one of aspects 1 to 13.

BRIEF DESCRIPTION OF THE DRAWINGS

The following description of the figures of specific embodiments of the invention is merely exemplary in nature and is not intended to limit the present teachings, their application or uses.

Figure 1:
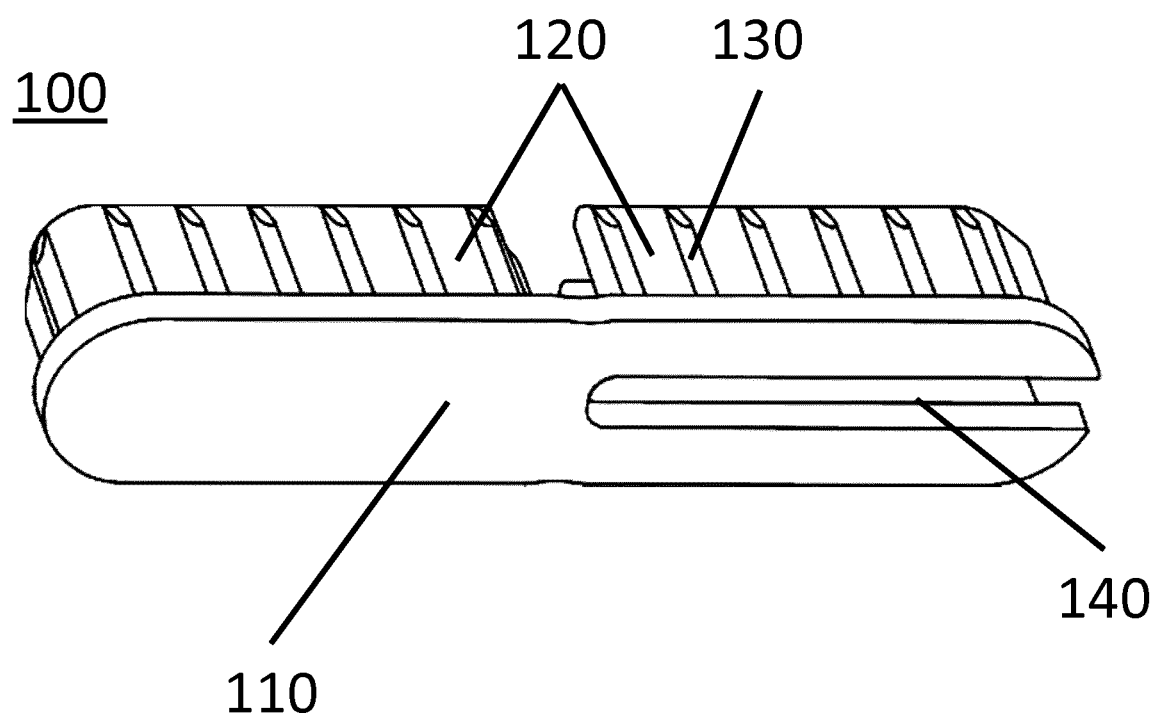
FIG. 1 shows a polymeric cap (100).

Throughout the figures, the following numbering is adhered to: 100—polymeric cap; 110—buffer section; 120—clamping section; 130—oblong protrusions; 200— horizontal metal profile; 300—vertical metal profile; 400—coupling clip; 500—rack system.

DETAILED DESCRIPTION

The present invention will be described with respect to particular embodiments but the invention is not limited thereto but only by the claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional elements or method steps. The terms "comprising", "comprises" and "comprised of" when referring to elements or method steps cited herein also include embodiments which "consist of" said elements or method steps cited herein. Furthermore, the terms first, second, third and the like as used herein are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Rack System

Provided herein are rack systems. They may be used, for example, for attachment of shelving or drawers and the like for the storage of objects. Additionally or alternatively, the rack systems may be used in sterile transport carts or static shelving in the medical industry. In particular the rack system here in an adjustable rack system, for instance, the height of the profiles that support shelves or drawers can be adjusted.

The rack systems provided herein comprise a plurality of metal profiles and a polymeric cap may be disposed on one end of at least one of the metal profiles. An exemplary polymeric cap is shown in FIG. 1, and is described more in detail elsewhere herein.

In some embodiments, the polymeric cap is disposed on a first end of a metal profile at the terminal edge, wherein the terminal edge is flat.

In some embodiments, the first end of at least one metal profile selected from the plurality of metal profiles is dismountably attached to an adjoining metal profile. In these embodiments, at least a part of the polymeric cap is disposed between the first end and the adjoining (first) metal profile. Thus, at least a part of the polymeric cap can be said to contact flanking metal profiles, wherein the recitation "flanking metal profiles" refers to the at least one metal profile selected from the plurality of metal profiles, and the other adjoining (first) metal profile.

In some embodiments, a second end of the at least one metal profile opposite to the first end is dismountably attached to another (second) adjoining metal profile as well. In these embodiments, at least a part of a further polymeric cap is disposed between the second end and the other (second) adjoining) metal profile as well. Accordingly the metal profiles are protected by the polymeric cap(s). In addition, the polymeric cap(s) reduce friction at the joints between the metal profiles, and the polymeric cap(s) increase the forces in the joints between the metal profiles. The increase of force between joints increases the rigidity of the resulting rack system. The reduction in friction at the joints between the metal profiles allows for ease of assembly and adjustment to the height of a drawer or shelf.

In some embodiments, some of the metal profiles in the plurality of metal profiles are arranged horizontally and some of the metal profiles in the plurality of metal profiles are arranged vertically. In particular, the first end disposed on a horizontal profile may be configured for dismountable attachment to a vertical profile. Accordingly, the horizontal profiles and the vertical profiles may be disposed mutually perpendicular, wherein the term "mutually perpendicular" indicates that the angle between the horizontal profiles and the vertical profiles is about 90°. At least a part of a polymeric cap may be disposed between the first end of the horizontal profile and the vertical profile. A horizontal profile is preferably one attachable to a drawer or shelf or other type of object support body.

While a metal profile disposed with the polymeric cap may be known as horizontal profiles, and a metal profile to which the horizontal profile is dismountably attached is known as a vertical profile, it is appreciated that the terms horizontal and vertical do not limit the orientation of the profiles; the rack system may be disposed, for instance, in an inclined global orientation.

In some embodiments, the vertical profiles are disposed with a plurality of apertures. Optionally, the apertures are regularly spaced. In particular, each aperture is configured for receiving a coupling clip for dismountable attachment of the first end of a horizontal profile.

In some embodiments, a vertical profile is provided with a coupling face—a face of the vertical profile to which a horizontal profile dismountably attaches. The coupling face is typically planar or contains a planar region. A coupling face may be provided with the plurality of apertures. There may be 1, 2, or 4 coupling faces.

Thus, the metal profiles may form a frame which can be used to support, for example, shelving and/or baskets. In some embodiments, the frame is essentially cuboid.

Metal Profiles

Further provided herein is a metal profile configured for use in a rack system provided herein.

In some embodiments, the metal profiles are hollow. Hollow metal profiles have the advantage of having low weight. Preferably, the hollow metal profiles are made of aluminium. Hollow aluminium profiles provide a further weight advantage.

The hollow spaces within a horizontal metal profile may serve as a slot void space for receiving a coupling clip. Thus, in some embodiments the first end and/or the second end of a horizontal metal profile may be disposed with a slot for receiving the coupling clip.

In a preferred embodiment, a horizontal metal profile comprises a two stage slot having a first depth with a wider opening and a second depth having a narrower opening. The first depth receives a load bearing part of the coupling clip, while the second depth receives the tapered member, and the narrower opening draws the horizontal metal profile towards the horizontal metal profile as tapered member advances into the narrower opening.

The hollow spaces within a vertical metal profile may also serve as a void space for receiving the coupling clip. Thus, in some embodiments the vertical metal profile is provided with a plurality of apertures each for receiving the coupling clip.

In some embodiments, the metal profiles are made of aluminium.

In some embodiments, the metal profile is an oblong profile. In particular, the metal profile may, in some embodiments, be described as longitudinal, straight and/or linear.

In some embodiments, the metal profile may be manufactured by means of extrusion. Extrusion is an efficient manufacturing technique for manufacturing metal profiles. Also, extrusion allows great liberty for designing the shape of the metal profiles. Accordingly, the metal profiles provided herein may be extruded metal profiles.

In some embodiments, the metal profile is a steel profile

The metal profile may be used for supporting an object support body such as shelves and/or baskets and/or drawers. Accordingly the metal profile may function as a structural element for racking in storage applications.

Coupling Clip

A coupling clip may be used for dismountably attaching metal profiles to one another, namely a vertical profile to one or more horizontal profiles as detailed elsewhere herein. In some embodiments, the coupling clip may be a coupling clip disclosed in FR2606842 or FR2628157, which are incorporated herein by reference.

In some embodiments, the coupling clip comprises a tapered member. This can enhance the mechanical connection between abutting metal profiles. It is preferred that the horizontal profile slot is configured to fittingly receive the coupling clip tapered member.

Polymeric Cap

As detailed above, the rack systems and horizontal profiles provided herein comprise at least one polymeric cap. Preferably a polymeric cap is provided at each end of most metal profiles, more preferably at each end (first and second end) of the horizontal metal profiles.

The polymeric cap allows for easy adjustment of a height of a shelf or drawer attached to the rack system. Also, the polymeric cap protects abutting metal profiles from damage. Generally, the polymeric cap is flexible compared to the metal profiles. This can be explained by Young's modulus of most polymers being significantly lower than Young's modulus of most metals. Accordingly, the flexibility polymeric cap can be useful to compensate for small process variations during rack system manufacture. This support can enhance the rigidity of the rack systems as a whole. In addition, the polymeric caps mitigate damage from abutting metal profiles. Without reducing the invention to any theory or mode of operation, it is believed that the higher flexibility of the polymeric cap compared to the metal profiles allows compensating for process variations. This further creates a clamping tension and results in increased rigidity of the rack due to compression of the polymeric cap between abutting metal profiles.

In some embodiments, the polymeric cap is compressible. This can enhance the mechanical connection between abutting metal profiles.

In some embodiments, the polymeric cap comprises polyoxymethylene (POM). POM is a highly suitable material for the polymeric caps provided herein. For example, POM has excellent rigidity and impact toughness. Further advantages are its high abrasion resistance and creep resistance. Furthermore, POM has a good appearance, hydrolytic stability, fatigue endurance, and it has a low coefficient of friction. Especially POM's rigidity, abrasion resistance, solvent resistance, and its low coefficient of friction are highly advantageous in the context of the present invention.

In some embodiments, the polymeric cap comprises a buffer section and a clamping section. The buffer section serves to form a mechanical barrier between abutting metal profiles in rack systems, in particular it is disposed between horizontal and vertical metal profiles. The clamping section may comprise a plurality of oblong protrusions that are fittingly received by the profile first end. Additionally or alternatively, the clamping section may be at least partly tapered. The clamping section serves to form a mechanical connection between the polymeric cap and a metal profile, namely, a slidable push fit connection to the horizontal profile. Accordingly, these polymeric caps can enhance the mechanical connection between abutting metal profiles.

Further provided herein is a polymeric cap configured for use in a rack system provided herein. Preferably, this polymeric cap is a polymeric cap according to any one of the embodiments provided above.

In some embodiments, the buffer section is the part of the polymeric that cap mates with the face of an abutting metal profile. In some embodiments, the abutting metal profile has an ellipsoid cross section, and the buffer section of the polymeric cap may be shaped as a rectangular cuboid from which a matching volume is excised. Alternatively or additionally, the abutting metal profile has rectangular cross section, and the buffer section of the polymeric cap has a flat end face. Accordingly, the polymeric cap may provide a tight fit between abutting metal profiles.

Preferably, the polymeric cap comprises a slit. The slit is disposed in the buffer section and allows sliding the polymeric cap over a load bearing part of the coupling clip provided herein. Accordingly, the mechanical connection between two metal profiles can be efficiently accomplished.

When these polymeric caps are applied to the rack systems provided herein, downward force applied to the first end of the horizontal metal profile may increase the strength of the dismountable joint between the horizontal profile and the vertical profile. Accordingly, the rack system can increase its stability as a heavy object is placed on a shelf or drawer.

EXAMPLES

Example 1

In a first example, reference is made to FIG. 1. FIG. 1 shows a polymeric cap (100). The polymeric cap (100) comprises a buffer section (110) and a clamping section (120). The buffer section (110) serves to form a mechanical barrier between abutting metal profiles (not shown) in rack systems (not shown). The clamping section (120) serves to form a mechanical connection between the polymeric cap (100) and a horizontal metal profile (not shown) at the first or second end. In addition, the buffer section (110) of the polymeric cap (100) comprises a slit (140).

Example 2

Figure 2:
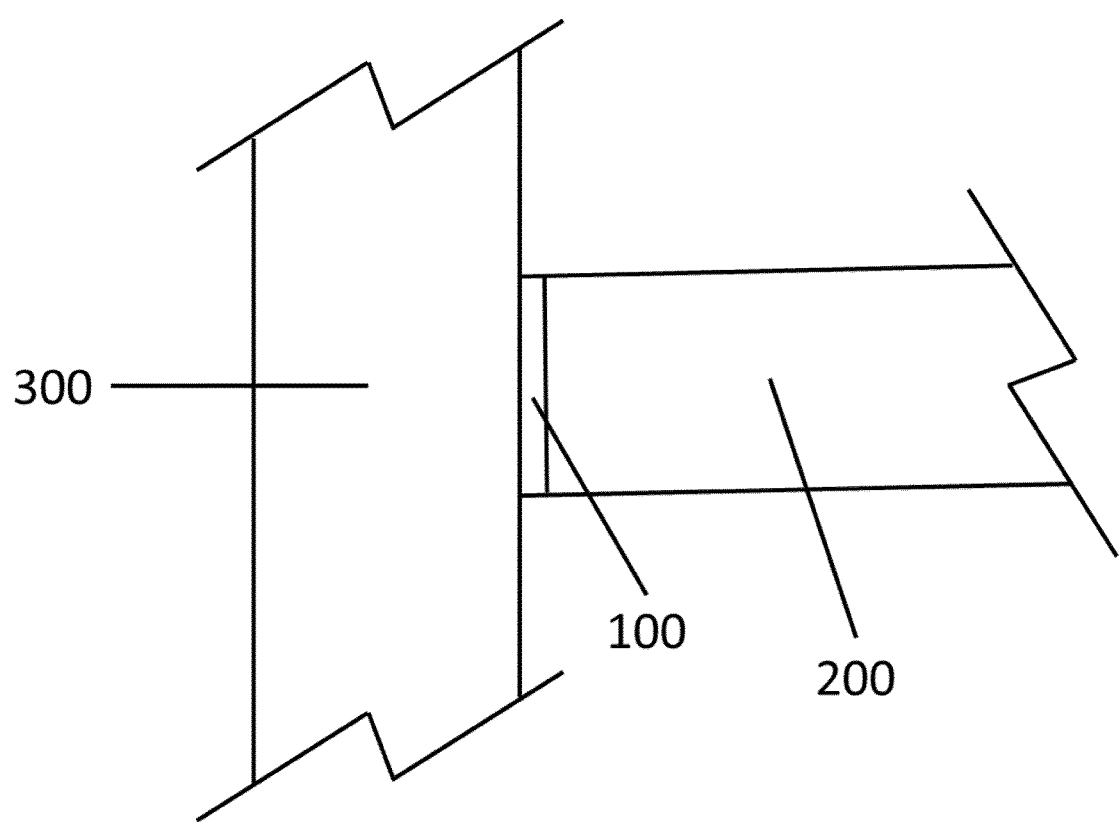
FIG. 2 shows a schematic representation of a mechanical connection between two metal profiles (200,300), a horizontal profile (200) and a vertical profile (300).

In a further example, reference is made to FIG. 2. FIG. 2 shows a schematic representation of a close up of a mechanical connection between a horizontal metal profile (200) and a vertical metal profile (300). Between the horizontal metal profile (200) and the vertical metal profile (300), a polymeric cap (100) is positioned. The polymeric cap (100) allows for a mechanical buffer between the horizontal metal profile (200) and the vertical metal profile (300).

Example 3

Figure 3:
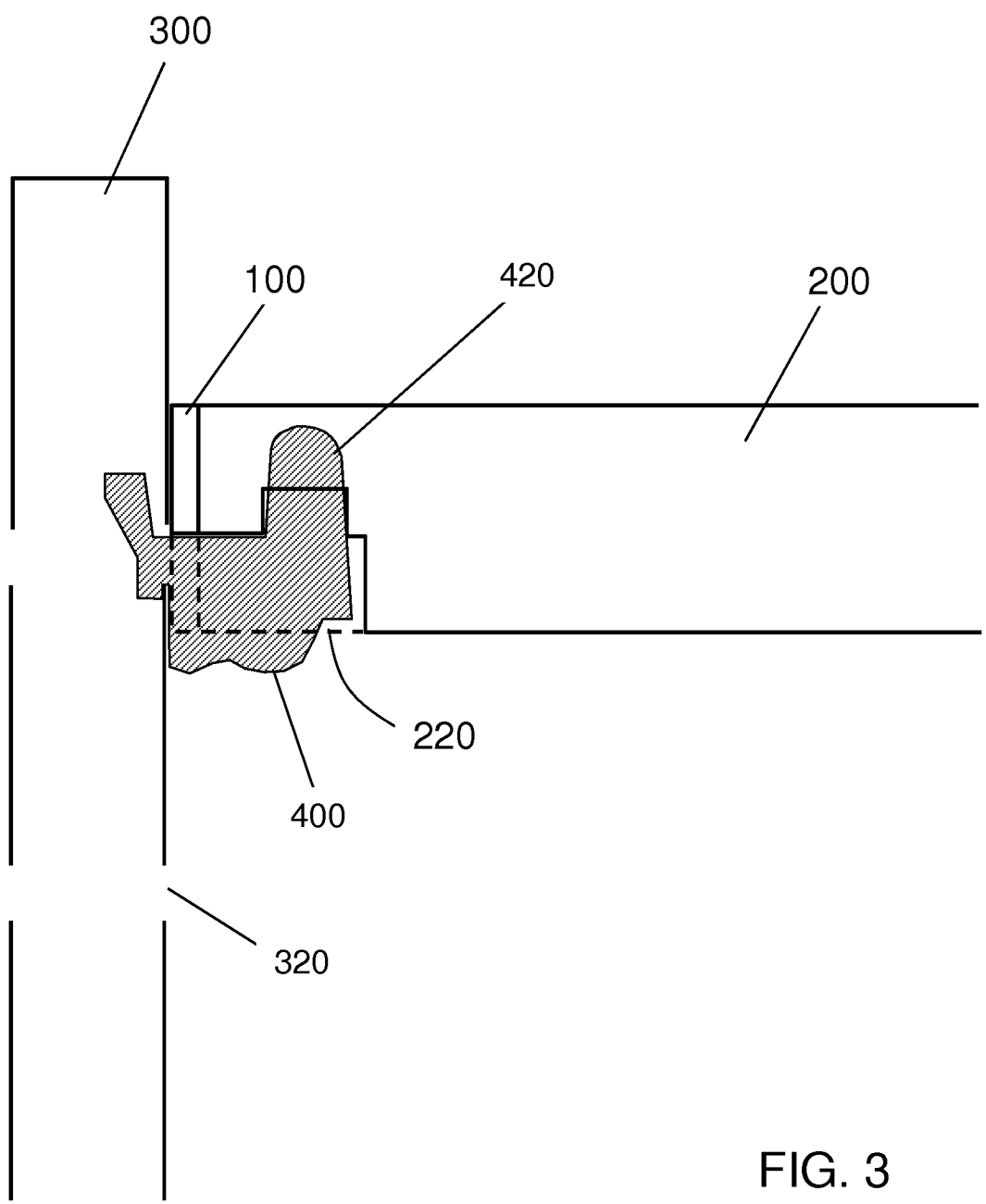
FIG. 3 shows several components of a rack system (500).

In a further example, reference is made to FIG. 3. FIG. 3 shows several components of a rack system in cross-section. In particular, FIG. 3 shows a polymeric cap (100), a horizontal metal profile (200) provided with a slot (220), a vertical metal profile (300) disposed with a plurality of apertures (320), and a coupling clip (400). The polymeric cap (100) shields the end of the horizontal metal profile (200) and the vertical metal profile (300). The coupling clip (400) allows forming a mechanical connection between the vertical metal profile (300) and a further horizontal metal profile (not shown). The tapered member (420) of the coupling clip (400) is shown.

Example 4

Figure 4:
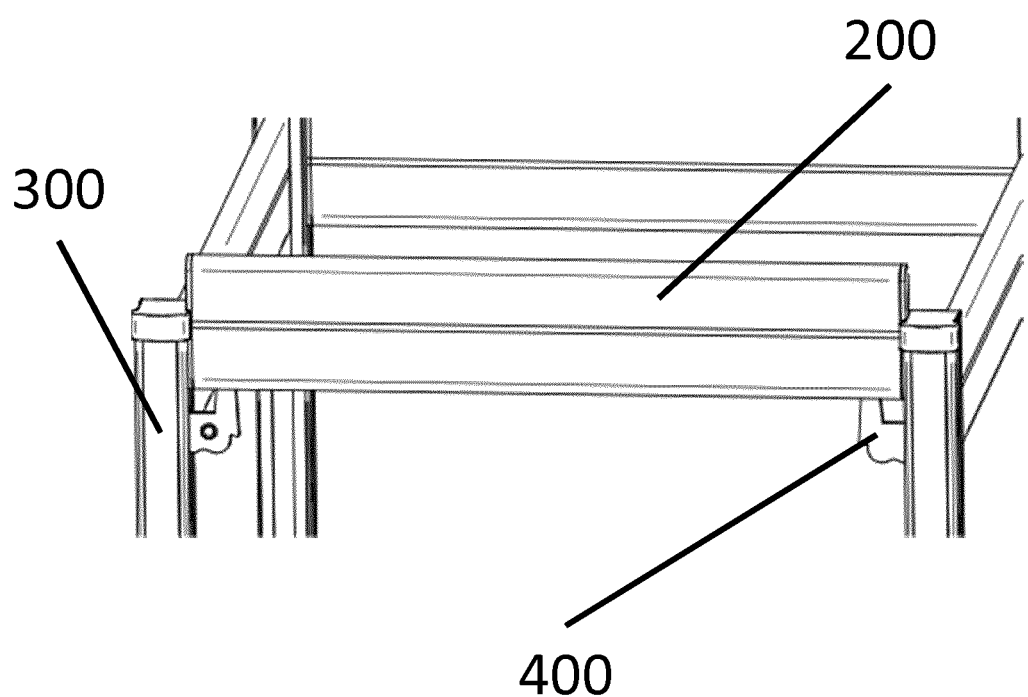
FIG. 4 shows how a horizontal metal profile (200) can be fastened on a vertical metal profile (300) by means of a coupling clip (400).

In a further example, reference is made to FIG. 4. FIG. 4 shows the formation of a mechanical connection between vertical bars (300), and a horizontal bar (200). In particular, coupling clips (400) are attached to the vertical bars. The horizontal bar (200) can be made to mechanically engage with the coupling clips (400) through exertion of downward pressure on the horizontal metal profile (200).

Example 5

Figure 5:
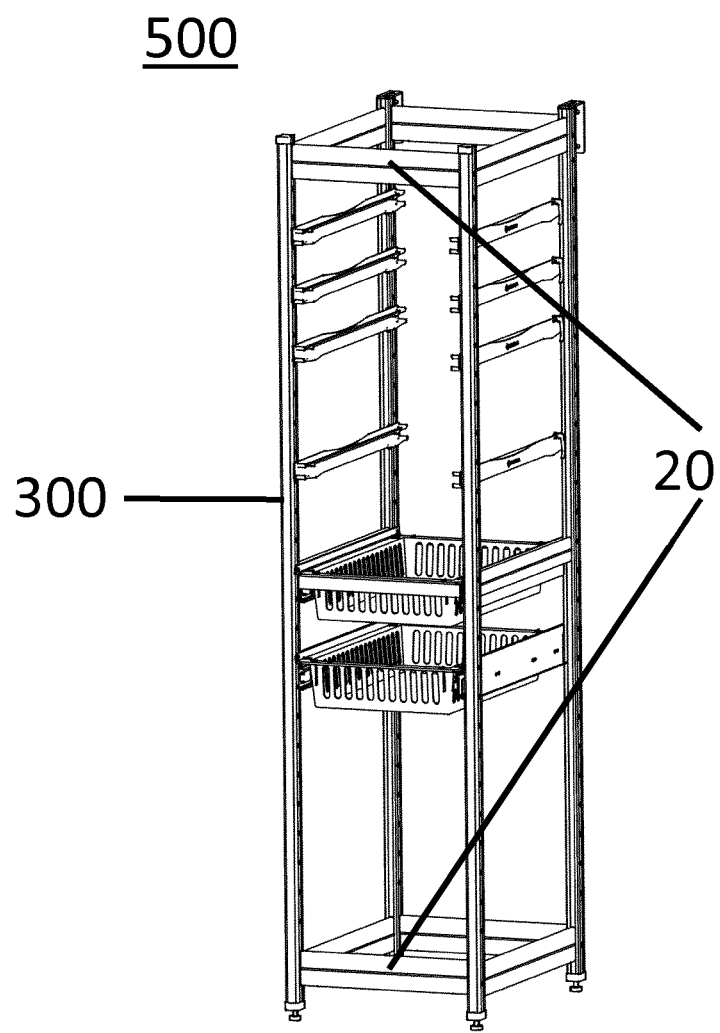
FIG. 5 shows a rack system (500).

In a further example, reference is made to FIG. 5. FIG. 5 shows an assembled rack system (500). The ends of the horizontal metal profiles (200) are capped with polymeric caps (not shown). Accordingly, damage of the vertical metal profiles (300) by the ends of the horizontal metal profiles (200) is avoided.

The invention claimed is:

1. A rack system (500) comprising a plurality of metal profiles (200,300), one or more of the metal profiles (200, 300) comprising a first end, wherein the first end is disposed with a polymeric cap (100) and is dismountably attached to an adjoining metal profile (200, 300) of the plurality of metal profiles,
   wherein at least a part of the polymeric cap (100) is disposed between the first end and a face of the adjoining metal profile (200,300) wherein some of the metal profiles (200,300) are arranged horizontally and some vertically,
   wherein the first end disposed on a horizontal metal profile (200) is configured for the dismountable attachment to a vertical metal profile (300), and wherein at least a part of the polymeric cap (100) is disposed between the first end of the horizontal metal profile (200) and the vertical metal profile (300), and
   wherein the vertical metal profiles (300) are disposed with a plurality of apertures (320), along at least one face of the vertical metal profile (300), each aperture configured for receiving a coupling clip (400) for dismountable attachment to the first end of the horizontal profile (200), wherein:
   the coupling clip (400) comprises a tapered member (420),
   the horizonal profiles (300) are each disposed with a horizonal profile slot (220) configured to fittingly receive the coupling clip tapered member (420), and
   the polymeric cap (100) is configured to be compressed between the adjoining metal profile (200,300) as the tapered member (420) advances into the horizonal profile slot (220).

2. The rack system (500) according to claim 1, wherein the polymeric cap (100) comprises polyoxymethylene (POM).

3. The rack system (500) according to claim 1, wherein the polymeric cap (100) comprises a buffer section (110) and a clamping section (120).

4. The rack system (500) according to claim 3, wherein the clamping section (120) comprises a plurality of oblong protrusions (130) that are fittingly received by the profile first end.

5. The rack system (500) according to claim 3, wherein the clamping section (120) is tapered.

6. The rack system (500) according to claim 1, wherein the polymeric cap (100) is disposed on the first end at its the terminal edge, and wherein the terminal edge is flat.

7. The rack system (500) according to claim 1, wherein the rack system (500) is a rack system for shelving or drawers.

8. The rack system (500) according to claim 1, wherein the metal profiles (200,300) are hollow.

9. The rack system (500) according to claim 1, wherein the metal profiles (200,300) are made of aluminum.

10. The rack system (500) according to claim 1, wherein the plurality of apertures (320) are regularly spaced.

* * * * *